June 22, 1954　　　　F. C. LOGEMAN　　　　2,681,533
GRINDING MACHINE HEADSTOCK
Filed Sept. 7, 1951　　　　　　　　　　　　2 Sheets-Sheet 1
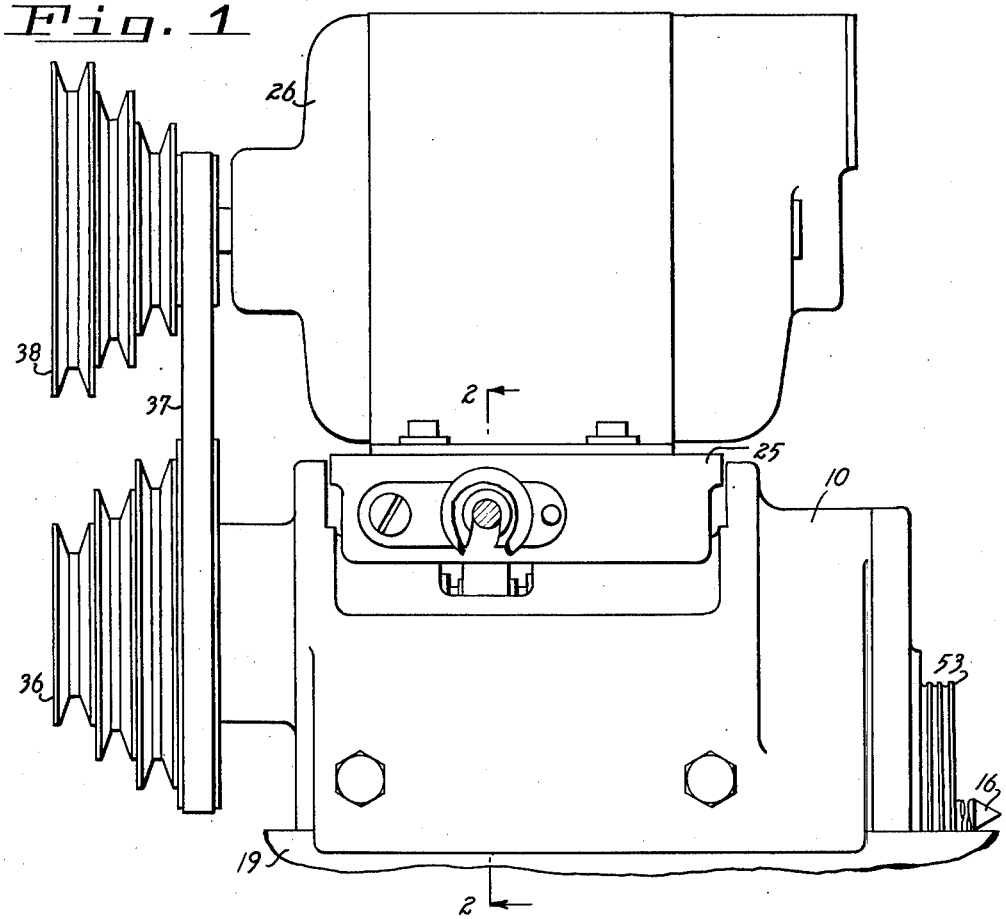
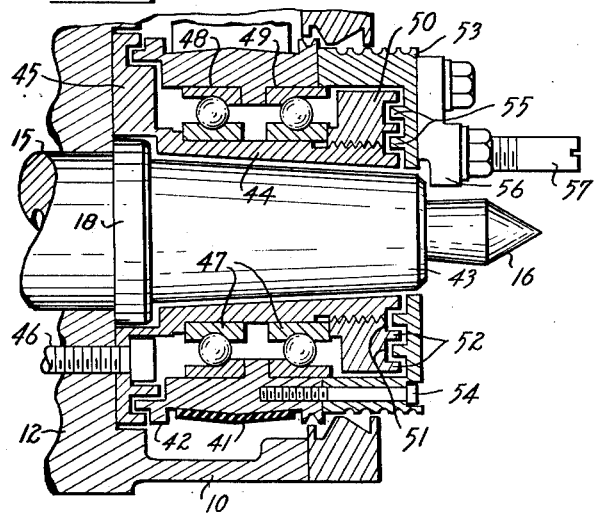
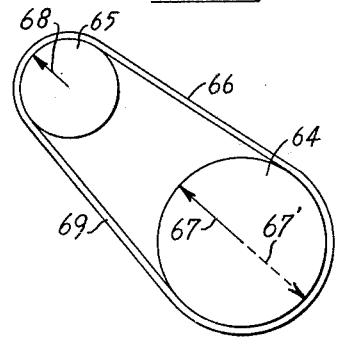
INVENTOR.
FREDERICK C. LOGEMAN
BY
H. K. Parsons + L. W. Wright
ATTORNEYS.

June 22, 1954   F. C. LOGEMAN   2,681,533
GRINDING MACHINE HEADSTOCK
Filed Sept. 7, 1951   2 Sheets-Sheet 2

INVENTOR.
FREDERICK C. LOGEMAN
BY
H. K. Parsons & L. W. Wright
ATTORNEYS.

Patented June 22, 1954

2,681,533

UNITED STATES PATENT OFFICE 2,681,533

GRINDING MACHINE HEADSTOCK

Frederick C. Logeman, Branch Hill, Ohio, assignor to The Cincinnati Milling Machine Co., Cincinnati, Ohio, a corporation of Ohio Application September 7, 1951, Serial No. 245,454

3 Claims. (Cl. 51—236)

This invention relates to improvements in headstock structures and particular reference to an improved headstock construction for use in connection with precision grinding machines or the like.

Present day requirements demand that precision grinding be effected to within very fine tolerances both as to dimension and freedom of the produced surface from even the most minute chatter marks or other blemishes. At the same time, in production of cylindrical or like surfaces of revolution, it is necessary that the work be rotated during the grinding operation, and limitations as to accuracy and high degree of finish of the work may result from slight runout or irregularity in the bearings supporting the work or vibratory effects as respects other parts of the grinding machine. In the search for extreme accuracy and reduction in error due to spindle play, bearing irregularities or the like, resort has been made to employment of work supports in the form of centers or points engaged in terminal sockets in the work, rotatably supporting the work while the drive connection has been independent of the work centers themselves. These drive connections, however, even though constructed to high commercial limits of accuracy have tended to produce measurable errors or inaccuracies on the work due either to slight irregularities in the anti-friction bearing mountings for the driving member, variations in belt structure, or fluctuation in the drive force to the work, any of which factors in the hitherto known commercial structures have been transmitted to the work.

It is, therefore, the principal object of the present invention to provide an improved headstock structure which will, to the maximum, isolate the drive mechanism effects from the work and its supporting center and completely eliminate any direct reaction between said mechanism and the work.

A further object of the invention is the provision of a structure in which the final drive is immediately adjacent but isolated from the work support, and the remaining elements of the drive so connected with the headstock as to permit of ready tensioning adjustments of the belt mechanisms employed but with a minimum of transmission of vibratory reactions to the work center supporting portion of the headstock.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a front elevation of a headstock mechanism embodying the present invention.

Figure 4 is an enlarged section of the isolation bearing and associated parts.

Figure 5 is a diagrammatic view illustrating one source of drive irregularities.

Figures 2, 3:
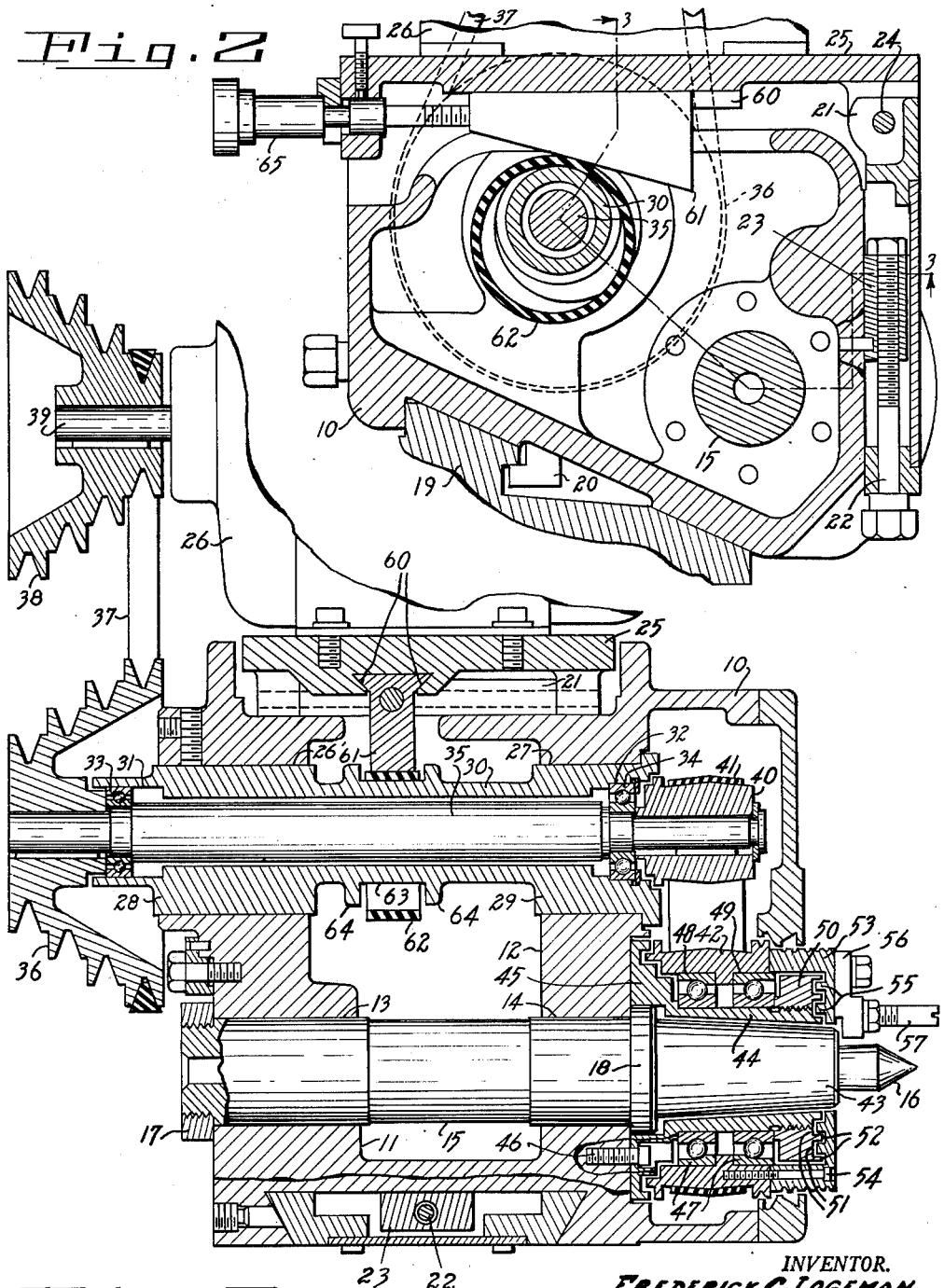
Figure 2 is a sectional view on the line 2—2 of Figure 1.
Figure 3 is an expanded sectional view on the line 3—3 of Figure 2.

In the drawings, the numeral 10 designates the main casting or frame of the headstock unit having the heavy ribs or wall sections as at 11 and 12 formed with the cylindrical bores or journals 13 and 14 to receive the headstock spindle 15 in which is mounted the work supporting center 16. In the present instance, means such as the nut 17 has been shown reacting on the spindle to draw its shoulder 18 into tight locking engagement with the frame wall 12. It will be understood, however, that in some instances the spindle 15 may be mounted for rotation instead of locked in what is known as a "dead center" condition.

The headstock, it will be noted, is designed to be supported as an entirety on the table 19 of a conventional center type grinding machine, being secured by clamps 20. Rearwardly, the frame or casting is provided with a vertical slide 21 whose position is controlled by the adjusting screw 22 engaged in the headstock from portion or nut 23. Pivoted to the upper end of the slide at 24 is the motor platen or table 25 on which is secured the drive motor 26.

The walls 11 and 12 of the frame are bored at 26' and 27 to receive the bearing portions 28, 29 of the rotatably adjustable journal sleeve 30. This sleeve is eccentrically bored as at 31 and 32 to receive the antifriction bearings 33 and 34 for the countershaft 35. This countershaft supports on one end the multiple sheave pulley 36 coupled by belt 37 with similar oppositely disposed pulley 38 on shaft 39 of the motor 26. It is provided at its opposite end with a pulley 40 supporting belt 41 for driving the pulley 42.

The spindle 15 has an extension 43 beyond the shoulder 18 which is in engagement with the wall 12 of the frame, and carries a center point 16. As has been pointed out, an important feature of the present invention is the complete isolation of the work drive mechanism from the work support mechanism so that the work will run absolutely true with respect to the grinding wheel and will not be effected by even minute belt thickness variations, runouts in bearings, drive pulleys or the like. To this end, there has been provided the bearing tube or sleeve 44 having a basal annular flange 45 rigidly secured to the wall 12 of the main headstock or casing by bolts 46.

By reference particularly to Figure 4, it will be seen that the tube 44 projects substantially co-extensively with the portion 43 of the spindle but in spaced or isolated relation with respect to the spindle and out of contact therewith while the basal flange 45 is rigidly secured to the wall of the casting. The portion 44 is exteriorly shaped to receive the spaced anti-friction bearing units 47 interfitting with the seats 48 and 49 of the pulley 42 to support this pulley for free rotation about the member 44 as a support. A suitable lock nut structure 50 secures the parts in assembled relation, the nut forming, in effect, a terminal portion of the tube or sleeve element and being provided with annular grooves 51 intermediate the annular ribs 52.

The driving or face plate 53 is secured to the end of the pulley by bolts 54 and is provided with ribs 55 interfitting with the ribs 52 of the nut 50 to provide a tortuous bearing protecting seal while permitting free rotation of the pulley and associate parts with respect to its support. The face plate is further provided with a radial inwardly extending portion, or portions, such as 56, carrying a work driving dog 57.

For adjusting the position of the platen 25 and thus the tension of the belt 37, the platen is provided with ways 60 slidably mounting the tapered base of the wedge member 61 which bears on the anti-friction ring 62 loosely encircling the central portion 63 of the bushing or journal 30, being held against lateral displacement by the ribs 64. An adjusting screw 65 serves variably to position the wedge intermediate the platen and ring for swinging the platen about its pivot. The motor may thus be variably positioned for effecting the tension of the driving belt but is non-rigidly held and capable of a slight yielding action, tending to isolate motor vibrations or irregularities in the motor drive train as respects the headstock in place of having a tendency to directly transmit the same as would result from a rigid mounting of the motor upon the headstock.

As indicated in Figure 3, the portion 63 of the sleeve 30 carrying the abutment roller 62 is disposed concentric with the countershaft 35. Thus, rotation of the eccentric journal 30 from its position shown in Figure 3 to effect tightening of the belt 41 while raising the pulley 36 will also react through the wedge block 61, tending to swing platen 25 upward in a manner to maintain proper tension on belt 37.

It is a well-recognized fact that in the commerical production of pulleys, as well as gears and balls or rollers for anti-friction bearings and their races there are slight eccentricities or size variations. While these may be relatively small they are sufficient to set up an undesirable periodic or other vibration. An example has been diagrammatically illustrated in Figure 5 in which the numeral 64 designates one pulley of a pair, and 65, a smaller pulley, the two pulleys being connected by a drive belt 66. The radius line 67 has been directed to the high point or maximum effective eccentricity of the pulley 64 and a radius 68 to a similar point of the pulley 65. In Figure 5 these radii extend in the common direction so that the low point on pulley 64 and the high point on pulley 65 are in joint engagement with the belt 66. The pulleys have been shown with a two to one size ratio, and as the pulley 64 makes a half revolution so that the radius 67 moves to the position 67' shown in dotted lines, pulley 65 will have made a complete revolution causing the two high points to be in opposition, placing a greater strain or tension on the belt and setting up a stress reacting to move the centers of rotation of the respective pulleys toward each other. Thus, with the structure in question there will be a constant tendency toward successive pulling of the centers together and releasing which, with the parts operating at normal high speeds, will tend to create an amplified periodic vibration condition.

Tests further show that commercial drive belts, such as 66, do not have an absolute uniformity of size, thickness and flexibility throughout their length with the result that any extra thickness, stiffness or the like of the belt 66 as at the point 69, for example, as it passes successively around the pulleys 64 and 65 will accentuate the pulsations of the drive and if the parts are mounted in prior conventionally known manners, such pulsations or vibrations will be transmitted to the work holding center, impairing the ultimate precision finish which it is sought to obtain. By the present invention, an isolation of the power transmitting train and its support from the work support, such potential reactions are minimized or eliminated.

From the foregoing description taken in connection with the accompanying drawings, it is evident that there has been provided an improved grinding machine headstock structure in which the center point for positioning the work is rigidly held and positioned by the main walls of the headstock casting or frame, and that means are provided immediately surrounding and overlying the projecting work engaging center of the headstock for effecting power rotation of the work, but that the support for such work driving means is an independent unit itself mounted on a rigid wall of the headstock and so spaced from the contained center that it is entirely separated or isolated therefrom. As a result of this structure, any breathing or slight give and take due to belt variation, countershaft vibration, or other irregular action is isolated from and has no effect upon the work supporting center so that the work may be freely accurately rotated without tendency to vibration or displacement except as effected only by the grinding wheel pressure which during final precision finishing is, of course, very slight. It will be further noted that the mounting of the parts is such as to permit of ready adjustment of the tension of either the belt to the face plate pulley or the belt from the drive motor to the countershaft, but that the mechanism for adjustment of the face plate pulley belt, while causing general displacement of the countershaft and associate parts, reacts on the motor support in a manner to maintain substantially constant tension in the drive from the motor to the countershaft. It will further be noted that the particular manner of motor mounting and supporting not only takes care of this belt adjustment situation but tends to isolate any motor vibration from the headstock, thus additionally descreasing tendency to production of vibrations or the like in the headstock and work.

What is claimed is:

1. A headstock structure for a precision grinding machine including a frame having supporting walls, a headstock spindle extending transversely as respects said walls, means on the spindle engaging the walls to secure the spindle against movement relative to the headstock, said spindle having a supporting portion projecting beyond one of the walls, a work engaging center carried by said projecting portion, and a drive vibration isolating bearing having a base flange secured to said one of the walls in spaced circumscribing relation to the projecting portion of the spindle, said bearing having a tubular portion surrounding said projecting portion in spaced circumscribing relation thereto to provide an annular clearance space between the projecting portion of the spindle and said tubular portion, and a work driving member having a pulley portion rotatably mounted on said tubular portion and having a driving portion secured to the pulley portion and extending in spaced overlying relation to the work supporting center.

2. A headstock structure for a precision grinding machine including a frame having supporting walls, a headstock spindle extending transversely as respects said walls, means on the spindle engaging the walls to secure the spindle against movement relative to the headstock, said spindle having a supporting portion projecting beyond one of the walls, a work engaging center carried by said projecting portion, and a drive vibration isolating bearing having a base flange secured to said one of the walls in spaced circumscribing relation to the projecting portion of the spindle, said bearing having a tubular portion surrounding said projecting portion in spaced circumscribing relation thereto to provide an annular clearance space between the projecting portion of the spindle and said tubular portion, a work driving member having a pulley portion rotatably mounted on said tubular portion and having a driving portion secured to the pulley portion and extending in spaced overlying relation to the work supporting center, an anti-friction bearing unit intervening the tubular portion and the driving member, and means carried by said tubular member and reacting against said anti-friction bearing unit to secure the bearing unit and the driving member in position on said tubular member.

3. A headstock structure for a precision grinding machine including a frame having supporting walls, a headstock spindle extending transversely as respects said walls, means on the spindle engaging the walls to secure the spindle against movement relative to the headstock, said spindle having a supporting portion projecting beyond one of the walls, a work engaging center carried by said projecting portion, and a drive vibration isolating bearing having a base flange secured to said one of the walls in spaced circumscribing relation to the projecting portion of the spindle, said bearing having a tubular portion surrounding said projecting portion in spaced circumscribing relation thereto to provide an annular clearance space between the projecting portion of the spindle and said tubular portion, a work driving member having a pulley portion rotatably mounted on said tubular portion and having a driving portion secured to the pulley portion and extending in spaced overlying relation to the work supporting center, a retaining member for the work driving member carried by said tubular portion, said retaining member having an outer series of circular ribs disposed in concentric relation as respects the headstock spindle, a face plate having circular ribs to interfit with the ribs on the retaining member to form a tortuous seal, means securing the face plate to the driving member for actuation thereby, and a work driver carried by said face plate and extending in overlying relation to the work supporting center.

References Cited in the file of this patent

UNITED STATES PATENTS

| Number | Name | Date |
|---|---|---|
| 545,692 | Hunter | Sept. 3, 1895 |
| 1,188,601 | Alden | June 27, 1916 |
| 2,020,547 | Haas | Nov. 12, 1935 |
| 2,121,730 | Cole | June 21, 1938 |
| 2,139,397 | Wigglesworth | Dec. 6, 1938 |
| 2,278,264 | Hollengreen | Mar. 31, 1942 |
| 2,282,048 | Graf | May 5, 1942 |
| 2,404,613 | Belden | July 23, 1946 |

FOREIGN PATENTS

| Number | Country | Date |
|---|---|---|
| 409,930 | Germany | Feb. 17, 1925 |